Patented Feb. 9, 1937

2,070,455

UNITED STATES PATENT OFFICE 2,070,455

ICE CREAM

Clarence G. Spalding, Milford, Conn.

No Drawing. Application March 30, 1934, Serial No. 718,216

2 Claims. (Cl. 99—136)

This invention relates to improvements in the manufacture of ice cream, and includes an improved ice cream product, and an improved method of manufacture.

Ice cream is a concentrated food product. Its main constituents, i. e. fats, milk, proteins and sugar, leave little residue when digested. A small amount of gelatin is commonly added to ice cream but this is also a concentrated food product which, on digestion, leaves little residue.

The improved ice cream of the present invention retains the food values of ordinary ice cream but has a desirable bulk-giving characteristic imparted thereto by the incorporation of a suitable amount of pectin therein so that the ice cream, on digestion, will have a desirable bulk-giving and water-retaining residue which will facilitate elimination of the undigested portions of the ice cream.

It is one object of the present invention to provide an improved ice cream with desirable bulk-giving constituents remaining after digestion of its normal food constituents, such that the ice cream will have a mildly laxative action in the sense in which such action is due to the incorporation of a desirable amount of pectin therein.

It is a further object of the invention to provide an ice cream which, in addition to its ordinary constituents, including a small amount of gelatin to promote its manufacture, also has a desirable amount of pectin incorporated therein to impart to the ice cream a desirable bulk-giving constituent which remains and facilitates the elimination of the undigested portions of the concentrated food constituents which the ice cream contains.

The improved process of the present invention is one in which there is incorporated in the ice cream, along with the other constituents commonly used in making ice cream, a desirable amount of pectin which is so incorporated that it does not affect the desirable composition, texture, and taste, etc. of the ice cream, but imparts thereto added desirable properties, such as those above mentioned.

In using pectin in making an improved ice cream, I take advantage of the discovery I have made that the active principle of fruits which apparently gives to them their laxative action is their pectin content, and the discovery that by incorporating a sufficient amount of pectin in ice cream there can be imparted a desirable bulk-giving property which promotes the elimination of the concentrated residues which would normally remain after the digestion of ice cream.

I have found that when pectin is incorporated in ice cream and in sufficient amounts, it acts as a desirable bulk-giving constituent, giving bulk to the contents of the intestines and promoting the elimination of the undigested constituents of the ice cream which would normally remain in a concentrated state, because of the fact that the ice cream is almost entirely digested, leaving a minimum of normal residue.

The amount of pectin to be added to the ice cream will vary somewhat with the kind of ice cream and the method of manufacture, the extent to which it is aerated in the process of manufacture, and the extent to which it is desired to impart bulk to the undigested residue to promote its elimination. The amount of pectin may be, for example, around 1 to 2 ounces per gallon of ice cream.

Pectin is available as an article of commerce and is extensively used in jelly making. It is available, for example, in powdered form, admixed with varying amounts of sugar. It varies somewhat in its properties, depending upon the method of extraction, etc.

The pectin can be readily incorporated in the ice cream, for example, by dissolving it in the milk which is used in making the ice cream. The pectin does not replace the gelatin but is to be considered as an added agent, in addition to gelatin, in commercial ice creams where gelatin is now employed.

It will be evident that different commercial ice cream formulas can be employed, such as are now commercially employed in the manufacture of ice cream, with the use of the commercial ingredients such as cream, milk, milk powder, eggs, sugar, etc.

For example, a French ice cream may be made from cream, eggs, sugar, vanilla or other flavor, etc. for example, in the proportions of about 1 gallon of cream to 1 gallon of milk, 16 eggs for each 2 gallons of milk and cream, sugar, vanilla or other flavor, etc. and with the addition of a small amount of gelatin, for example, around ½ of 1%. For each 2 gallons of such a mixture, I add, for example, about 2 ounces of pectin, if the ice cream is not to be strongly aerated, or an increased amount up to e. g. 4 ounces for each 2 gallons of the above mixture if it is to be strongly aerated.

For imparting to the ice cream a mild laxative action the amount of pectin may be, for example, around 20 to 25 grains per individual serving of e. g. ⅛th of a quart. I have found that such an amount of pectin imparts a desirable bulk-giving and laxative action and converts the ice cream from one which leaves only a concentrated residue with little bulk to one having desirable residue which facilitates its elimination after its food value has been digested.

I claim:

1. An improved ice cream having in addition to the usual ingredients, such as cream, milk, sugar, flavor, etc., and including a small amount of gelatin, an amount of pectin sufficient to give to the undigested residue of the ordinary ice cream constituents a desirable bulk to facilitate elimination of the undigested residue of the normal ice cream constituents, the amount of pectin being around 1 to 2 ounces per gallon of the ice cream.

2. An improved ice cream containing around ½ of 1% of gelatin, in addition to the other ordinary ice cream constituents, and also containing a substantial amount of pectin sufficient to give to the residue remaining after digestion of the normal ice cream constituents a desirable bulk to facilitate their elimination, the amount of pectin being around 1 to 2 ounces per gallon of the ice cream.

CLARENCE G. SPALDING.